3,556,868
CHROMATE COATING COMPOSITION AND METHOD
Victor F. Ziemba, Detroit, Mich., assignor to Detrex Chemical Industries Incorporated, Detroit, Mich., a company of Michigan
No Drawing. Filed Feb. 21, 1968, Ser. No. 707,318
Int. Cl. C23f 7/26
U.S. Cl. 148—6.2                                    5 Claims

ABSTRACT OF THE DISCLOSURE

An aqueous solution for producing chromate conversion coatings on aluminum surfaces is described which contains in addition to water, iodate ions, hexavalent chromium and a fluorine bearing compound. One embodiment of this solution contains additionally silver. These solutions produce chromate conversion coatings on the aluminum surfaces by contact, and such solutions have longer effective lives than conventional chromate conversion coating solutions.

BACKGROUND OF THE INVENTION

(1) Field of the invention

Compositions for forming chromate conversion coatings on aluminum surfaces which comprise aqueous acid solutions of hexavalent chromium and fluorine bearing compounds are well known, certain of such compositions being described in U.S. Pat. Nos. 2,276,353; 2,507,956; 2,796,370 and 2,851,385. The composition described in U.S. Pat. 2,796,370 is particularly adapted to be used by spraying such composition on rapidly moving aluminum strip in the course of its manufacture. For this purpose, potassium ferricyanide (with or without ferrocyanide) is present with the chromate and fluorine bearing ingredients in the aqueous solution. This system gives good corrosion resistance, particularly to painted aluminum, however, as with other chromate conversion systems, the ability to coat aluminum is gradually lost as trivalent chromium builds up in the solution. Such trivalent chromium contamination must be removed when the level thereof becomes excessive by either an ion exchange process or by the addition of nitric acid and other well known chemicals. Ferricyanide compositions are known to decompose into toxic hydrogen cyanide above 150–160° F.

SUMMARY OF THE INVENTION

It is an object of this invention to provide an improved composition for producing chromate conversion coatings on aluminum, which composition resists a tendency to weaken with age. It is another object of this invention to produce such a chromate conversion coating composition which will create the desired coatings rapidly.

It is a further object of this invention to provide a composition which may be used over a wider range of operating temperatures without substantial decomposition.

It has been discovered that the above objects of this invention may be secured, and the hereinbefore disclosed problems of the prior art may be avoided by the provision of chromate coating compositions consisting essentially of aqueous solutions containing iodate ions in addition to hexavalent chromium and a fluorine bearing compound. An additional embodiment of this invention is such a coating composition containing additionally a silver bearing ingredient.

DESCRIPTION OF THE PREFERRED EMBODIMENTS

The aqueous chromate conversion coating composition of this invention consists essentially of a water solution containing iodate ions, hexavalent chromium and a fluorine bearing compound. This composition when applied at a temperature within the range of from about 90° F. to about 200° F., and at a pH within the range of from about 1.3 to about 2.2 for a period of time as low as about five seconds to metallic aluminum produces an effective chromate conversion coating on the aluminum surface. An additional embodiment of the composition of this invention consists essentially of a water solution containing iodate ions, hexavalent chromium, a fluorine bearing compound and an effective amount of a silver bearing ingredient.

An effective chromate conversion coating composition in accordance with this invention may be formulated by preparing an aqueous solution having a composition within the following ranges:

TABLE 1

|  | Concentration [1] |
| --- | --- |
| Iodate ion | .025–3.0 |
| Hexavalent chromium | 0.25–60.0 |
| Fluorine (present in fluorine bearing compound) | 0.1–20.0 |

[1] Grams/liter of aqueous solution.

A further embodiment of the composition of this invention having a composition within the ranges of Table 1, contains additionally an amount of silver within the range of from about 0.06 gram per liter to about 1.5 gram per liter. Sources of silver are for example silver nitrate and silver fluoride.

When the composition of this invention is utilized to form a chromate conversion coating on an aluminum surface, the effectiveness of such composition is very dependent upon the cleanliness of the aluminum surface when the aqueous composition is applied to it.

The chromic acid content of the system, if unneutralized chromic acid ($CrO_3$) is used as the source of hexavalent chromium, is limited to an amount within the range of from about 1.0 to about 5.0 grams per liter of solution, since this amount will give a pH within the range of about 1.3 to about 2.2 as described above. Thus, further addition of chromic acid must be neutralized to maintain the desired pH range. Other suitable sources of hexavalent chromium are, for example, sodium chromate, sodium dichromate, and potassium chromate.

If other fluorine containing compounds (such as for example potassium titanium fluoride, nickel fluoride, calcium fluoride, ammonium silco fluoride, sodium fluoroborate, sodium fluoride, sodium bifluoride, potassium fluoride and potassium bifluoride) are used in place of hydrofluoric acid, their relationship with the chromic acid present is dfferent. The following table gives the ranges for certain fluorine containing compounds providing the pH is maintained between about 1.3 and about 2.2 and all other conditions are the same.

TABLE II

|  | Concentration [1] |
| --- | --- |
| Hydrofluoric acid | 0.1–1.5 |
| Fluosilicic acid | 0.2–10.0 |
| Fluoboric acid | 1.0–25.0 |

[1] Grams per liter of aqueous solution.

When fluo-acids other than hydrofluoric are used within the recommended range of chromic acid, it may be necessary to add sufficient alkali (of Li, Na, K or $NH_4^+$) to neutralize the added fluo-acid. On the other hand, if it is desired to use an alkali metal salt of chromic acid, the unneutralized acids ($H_2SiF_6$ or $HBF_4$) can provide, at least in part, the necessary acidity.

Substitution of alkali metal iodates for iodic acid, such as, for example, ammonium iodate, sodium iodate, potassium iodate and calcium iodate, will alter the pH only slightly since only a small quantity of hydrogen ions are involved. Thus, adjustment with excess chromic, fluosilicic or fluoboric acids is not usually necessary.

If a coating chemical is prepared from the salts of chromic, hydrofluoric and iodic acids (or other fluo-acid salts) the pH can be brought into range by use of an acid such as nitric acid.

Further modification of the above chromating systems is possible by the introduction of silver to the extent of 0.06–1.5 grams per liter which is effective in improving the coating rate of the system.

All of the above systems are also effective when applied by immersion, brush or wipe-on application.

The ranges of the several variables stated can be extended under some circumstances. Thus, the pH can range from about 1.2 where occasionally bare areas on the treated metal are noted, to a pH of about 2.6 where thin coatings of a lower order than 30–40 mg. per sq. ft. are produced. Along with the changes in pH, the range of chromic acid concentration can be extended from somewhat less than about 0.5 gram per liter to about 6.0 grams per liter. Spray process time can also be varied from less than about 5 seconds, where coating weights of less than the desired minimum are usually encountered, to more than about 60 seconds, where heavy coatings are produced. Along with the increase in process time, the iodate concentration level can be extended to amounts within the range of from about 0.025 gram per liter to about 3 grams per liter, since in this range some acceleration of coating rate is noted. Also, with increased process time, the concentration of hexavalent chromium can be increased to about 60 grams per liter without eliminating the benefit due to the presence of iodate.

When utilizing the process and composition of this invention, the composition of the alloy treated is also important in the amount of coating obtained. Thus, if a solution containing 2.5 grams chromic acid, 0.5 gram hydrofluoric acid and 0.3 gram iodic acid per liter is applied for 60 seconds by spray to various types of cleaned aluminum, the following coating weights are noted:

TABLE III

| Alloy: | Coating wt. in mg. per sq. ft. |
|---|---|
| 3003 | 166 |
| 1100 | 134 |
| 2024 (clad) | 58 |
| 2024–T3 | 347 |
| 7075–T6 | 159 |
| 6061–T6 | 15 |

The following experiments were conducted. In each Example 1–24, 3003 aluminum panels 4″ x 6″ in size were cleaned. These prepared panels were chromated by spraying them with each of the aqueous compositions of Examples 1–24, rinsed, dried and weighed. Then after stripping in concentrated nitric acid, the panels were rinsed, dried and re-weighed. The differences in weights observed were used to determine coating weights.

EXAMPLE 1

| | G./l. |
|---|---|
| $CrO_3$ | 2.5 |
| HF | 0.5 | pH 1.65.

COATING WEIGHT

| Seconds: | Mg. per sq. ft. |
|---|---|
| 20 | 26 |
| 60 | 30 |

The unaccelerated system described in Example 1 shows large and undesirable fluctuation. Moreover this system is not capable of being controlled during use. At low time cycles coating weights are barely discernible.

EXAMPLE 2

| | G./l. |
|---|---|
| $CrO_3$ | 2.5 |
| HF | 0.5 |
| $HIO_3$ | 0.025 | pH 1.6.

COATING WEIGHT

| Seconds: | Mg. per sq. ft. |
|---|---|
| 20 | 40 |
| 60 | 52 |

EXAMPLE 3

| | G./l. |
|---|---|
| $CrO_3$ | 2.5 |
| HF | 0.5 |
| $HIO_3$ | 0.3 | pH 1.65.

COATING WEIGHT

| Seconds: | Mg. per sq. ft. |
|---|---|
| 5 | 42 |
| 10 | 60 |
| 20 | 80 |
| 60 | 145 |

EXAMPLE 4

| | G./l. |
|---|---|
| $CrO_3$ | 2.5 |
| HF | 0.5 |
| $HIO_3$ | 2.0 | pH 1.55.

COATING WEIGHT

| Seconds: | Mg. per sq. ft. |
|---|---|
| 20 | 32 |
| 60 | 83 |

EXAMPLE 5

| | G./l. |
|---|---|
| $CrO_3$ | 2.5 |
| HF | 0.5 |
| $HIO_3$ | 3.0 | pH 1.5.

COATING WEIGHT

| Seconds: | Mg. per sq. ft. |
|---|---|
| 20 | 14 |
| 60 | 58 |

EXAMPLE 6

| | G./l. |
|---|---|
| $CrO_3$ | 0.5 |
| HF | 0.1 |
| $HIO_3$ | 0.3 | pH 2.35.

COATING WEIGHT

| Seconds: | Mg. per sq. ft. |
|---|---|
| 20 | 19 |
| 60 | 46 |

EXAMPLE 7

| | G./l. |
|---|---|
| $CrO_3$ | 1.0 |
| HF | 0.2 |
| $HIO_3$ | 0.4 | pH 2.1.

COATING WEIGHT

| Seconds: | Mg. per sq. ft. |
|---|---|
| 20 | 35 |
| 60 | 84 |

EXAMPLE 8

| | G./l. |
|---|---|
| $CrO_3$ | 5.0 |
| HF | 1.0 |
| $HIO_3$ | 0.3 | pH 1.4.

COATING WEIGHT

| Seconds: | Mg. per sq. ft. |
|---|---|
| 20 | 68 |
| 60 | 94 |

EXAMPLE 9

| | G./l. |
|---|---|
| $CrO_3$ | 7.5 |
| HF | 0.5 |
| $HIO_3$ | 0.3 |
| pH 1.2. | |

COATING WEIGHT

| Seconds: | Mg. per sq. ft. |
|---|---|
| 20 | Bare areas evident |
| 60 | Bare areas evident |

EXAMPLE 10

| | G./l. |
|---|---|
| $CrO_3$ | 2.5 |
| HF | 0.5 |
| $HIO_3$ | 0.3 |
| $(NH_4)_2Cr_2O_7$ | 25. |
| pH 1.70. | |

COATING WEIGHT

| Seconds: | Mg. per sq. ft. |
|---|---|
| 20 | 44 |
| 60 | 86 |

EXAMPLE 11

| | G./l. |
|---|---|
| $CrO_3$ | 2.5 |
| HF | 0.5 |
| $HIO_3$ | 0.3 |
| $(NH_4)Cr_2O_7$ | 150 |
| pH 1.70. | |

COATING WEIGHT

| Seconds: | Mg. per sq. ft. |
|---|---|
| 20 | 22 |
| 60 | 40 |

EXAMPLE 12

| | G./l. |
|---|---|
| $CrO_3$ | 2.5 |
| HF | 0.5 |
| $HIO_3$ | 0.25 |
| $K_2Cr_2O_7$ | 25 |
| pH 1.6. | |

COATING WEIGHT

| Seconds spray: | Mg. per sq. ft. |
|---|---|
| 60 | 63 |

EXAMPLE 13

| | G./l. |
|---|---|
| $CrO_3$ | 2.5 |
| HF | 0.125 |
| $HIO_3$ | 0.3 |
| pH 1.75. | |

COATING WEIGHT

| Seconds: | Mg. per sq. ft. |
|---|---|
| 20 | 20 |
| 60 | 42 |

EXAMPLE 14

| | G./l. |
|---|---|
| $CrO_3$ | 2.5 |
| HF | 0.2 |
| $HIO_3$ | 0.3 |
| pH 1.7. | |

COATING WEIGHT

| Seconds: | Mg. per sq. ft. |
|---|---|
| 20 | 44 |
| 60 | 82 |

EXAMPLE 15

| | G./l. |
|---|---|
| $CrO_3$ | 2.5 |
| HF | 1.0 |
| $HIO_3$ | 0.3 |
| pH 1.70. | |

COATING WEIGHT

| Seconds: | Mg. per sq. ft. |
|---|---|
| 20 | 74 |
| 60 | 121 |

EXAMPLE 16

| | G./l. |
|---|---|
| $CrO_3$ | 5.0 |
| HF | 2.0 |
| $HIO_3$ | 0.3 |
| pH 1.4. | |

COATING WEIGHT

| Seconds: | Mg. per sq. ft. |
|---|---|
| 20 | 70 |
| 60 | 127 |

These coatings were soft and of a chalky appearance.

EXAMPLE 17

| | G./l. |
|---|---|
| $CrO_3$ | 2.5 |
| $H_2SiF_6$ | 1.0 |
| KOH | 0.6 |
| $HIO_3$ | 0.3 |
| pH 1.70. | |

COATING WEIGHT

| Seconds: | Mg. per sq. ft. |
|---|---|
| 20 | 68 |
| 60 | 121 |

EXAMPLE 18

| | G./l. |
|---|---|
| $CrO_3$ | 2.5 |
| $HBF_4$ | 2.6 |
| KOH | 1.5 |
| $HIO_3$ | 0.3 |
| pH 1.75. | |

COATING WEIGHT

| Seconds: | Mg. per sq. ft. |
|---|---|
| 20 | 58 |
| 60 | 155 |

EXAMPLE 19

| | G./l. |
|---|---|
| $CrO_3$ | 2.5 |
| HF | 0.5 |
| $HIO_3$ | 0.3 |
| $AgNO_3$ | 0.5 |
| pH 1.65. | |

COATING WEIGHT

| Seconds: | Mg. per sq. ft. |
|---|---|
| 20 | 153 |
| 60 | 249 |

EXAMPLE 20

| | G./l. |
|---|---|
| $HIO_3$ | 0.40 |
| HF | 0.50 |
| $CrO_3$ | 2.50 |
| AgF | 1.7 |

COATING WEIGHT

| Seconds: | Mg. per sq. ft. |
|---|---|
| 20 | 157 |

EXAMPLE 21

| | G./l. |
|---|---|
| $K_2Cr_2O_7$ | 3.7 |
| $KF \cdot 2H_2O$ | 2.5 |
| $NaIO_3$ | 0.34 |
| $HNO_3$ (42° Be.) | 4.5 |
| pH 1.7. | |

COATING WEIGHT

| Seconds immersion: | Mg. per sq. ft. |
|---|---|
| 60 | 68 |

Without the addition of nitric acid to the above formulation, the pH was 5.5 and no coating was formed.

EXAMPLE 22

|  | G./l. |
|---|---|
| $CrO_3$ | 2.5 |
| HF | 0.5 |
| $HIO_3$ | 0.4 |

COATING WEIGHT

| Seconds immersion: | Mg. per sq. ft. |
|---|---|
| 60 | 82 |

Certain panels treated in accordance with the above examples were subjected to a conventional salt spray test. A 3003 aluminum panel treated in accordance with Example 3 (both 20 second and 60 second spray) showed no failure after 504 hours. A similar panel treated in accordance with Example 1, that is with no iodate, shows slight failure after about 250 hours salt spray testing.

In the following Examples 23–41 solutions containing iodate ions, chromate ions and a fluorine bearing compound were applied by 60 second immersion (at 120° F.) to clean 3003 aluminum. The concentration of chemicals listed is in grams per liter of aqueous solution and the coating weight (C.W.) is reported in mg. per sq. ft.

Sources of Hexavalent Chromium

|  | Ex. 23 | Ex. 24 | Ex. 25 |
|---|---|---|---|
| $HIO_3$ | 0.31 | 0.31 | 0.31 |
| HF | 0.52 | 0.52 | 0.52 |
| $HNO_3$ | 2.15 | 1.36 | 2.15 |
| Hexavalent chromium source | [1] 4.10 | [2] 3.30 | [3] 4.85 |
| pH | 1.90 | 1.90 | 2.00 |
| C.W. | 85 | 105 | 86 |

Sources of Fluoride

|  | Ex. 26 | Ex. 27 | Ex. 28 | Ex. 29 |
|---|---|---|---|---|
| $HIO_3$ | 0.31 | 0.31 | 0.31 | 0.31 |
| Fluorine source | None | [4] 0.50 | [5] 1.18 | [6] 1.18 |
| $HNO_3$ | None | None | None | 0.77 |
| $CrO_3$ | 2.58 | 2.58 | 2.58 | 2.58 |
| pH | 1.60 | 1.60 | 1.70 | 1.60 |
| C.W. | 1.8 | 94 | 45 | 51 |

Sources of Fluoride

|  | Ex. 30 | Ex. 31 | Ex. 32 | Ex. 33 |
|---|---|---|---|---|
| $HIO_3$ | 0.31 | 0.31 | 0.31 | 0.31 |
| Fluorine source | [7] 1.18 | [8] 1.18 | [9] 5.0 | [10] 1.18 |
| $HNO_3$ | None | None | 0.77 | 0.41 |
| $CrO_3$ | 2.58 | 2.58 | 2.58 | 2.58 |
| pH | 1.85 | 1.70 | 1.40 | 2.00 |
| C.W. | 36.0 | 89 | 40 | 83 |

Sources of Fluoride

|  | Ex. 34 | Ex. 35 | Ex. 36 |
|---|---|---|---|
| $HIO_3$ | 0.31 | 0.31 | 0.31 |
| Fluorine source | [11] 1.76 | [12] 1.18 | [13] 1.60 |
| $HNO_3$ | 0.41 | 0.77 | 0.77 |
| $CrO_3$ | 2.58 | 2.58 | 2.58 |
| pH | 1.95 | 1.75 | 1.60 |
| C.W. | 105 | 68 | 103 |

Sources of Iodate

|  | Ex. 37 | Ex. 38 | Ex. 39 | Ex. 40 | Ex. 41 |
|---|---|---|---|---|---|
| Iodate source | [14] 0.3 | [15] 0.3 | [16] 0.3 | [17] 0.3 | [18] 0.3 |
| HF | 0.51 | 0.51 | 0.51 | 0.51 | 0.51 |
| $CrO_3$ | 2.58 | 2.58 | 2.58 | 2.58 | 2.58 |
| pH | 1.70 | 1.80 | 1.75 | 1.75 | 1.70 |
| C.W. | 95 | 96 | 104.0 | 101 | 98 |

[1] ($Na_2CrO_4$) sodium chromate.
[2] ($Na_2Cr_2O_7$) sodium dichromate.
[3] ($K_2CrO_4$) potassium chromate.
[4] (HF) hydrofluoric acid.
[5] ($K_2TiF_6$) potassium titanium fluoride.
[6] ($NiF_2$) nickel fluoride.
[7] ($CaF_2$).
[8] [$(NH_4)_2 SiF_6$] ammonium silico fluoride.
[9] ($NaBF_4$) sodium fluoborate.
[10] (NaF) sodium fluoride.
[11] ($NaHF_2$) sodium bifluoride.
[12] (KF) potassium fluoride.
[13] ($KHF_2$) potassium bifluoride.
[14] ($HIO_3$) iodic acid.
[15] ($NH_4IO_3$) ammonium iodate.
[16] ($NaIO_3$) sodium iodate.
[17] ($KIO_3$) potassium iodate.
[18] ($Ca(IO_3)_2$) calcium iodate.

It will be apparent from the above examples that the compositions of this invention when utilized in accordance with the process of this invention make possible the advantageous application of chromate films to aluminum in order to enhance its ability to resist corrosion. This effect is demonstrated by a comparison of clean 3003 aluminum with the clean metal chromated in accordance with our invention. The untreated metal failed badly in four hours of salt spray testing (ASTM: B117–61) while samples treated with a composition of this invention, gave performance of over 500 hours.

The appearance of a chromate film produced in accordance with this invention is also of use in the field of decorative finishes. These films vary in appearance from almost colorless, to iridescent, to a golden-yellow color and are hard and adherent.

While the conventional ferricyanide chromating compositions will decompose in use at elevated temperatures into toxic hydrogen cyanide, the compositions of our invention remain stable up to temperatures on the order of 200° F.

Having thus described our invention, we claim:

1. The method of forming a chromate conversion coating on a metal surface selected from the class consisting of aluminum surfaces and surfaces of alloys of aluminum comprising contacting said surface with a composition consisting essentially of a water solution containing (1) from about 0.025 to about 3.0 grams per liter of iodate ion, (2) from about 0.25 to about 60.0 grams per liter hexavalent chromium, and (3) from about 0.1 to about 20.0 grams per liter fluorine supplied by a fluorine bearing compound, and said solution having a pH in the range of from about 1.3 to about 2.2, and maintaining said composition in contact with said surface for a period of time from at least about five seconds.

2. The method of claim 1, wherein the water solution contains additionally an amount of silver in the range of from about 0.06 to about 1.5 grams per liter of solution.

3. The method of forming a chromate conversion coating on a metal surface selected from the class consisting of aluminum surfaces and surfaces of alloys of aluminum comprising contacting said surface with composition consisting essentially of a water solution containing (1) from about 0.025 to about 3.0 grams per liter of iodate ion, (2) from about 0.25 to about 60.0 grams per liter hexavalent chromium, and (3) from about 0.1 to about 20.0 grams per liter fluorine supplied by a fluorine bearing compound, and having a pH within the range of from about 1.3 to about 2.2, maintaining said composition in contact with said surface for a period of time from at least about five seconds at a temperature within the range of from about 90° F. to about 200° F., and then drying said surface.

4. An aqueous chromate conversion coating composition consisting essentially of a water solution containing (1) from about 0.025 to about 3.0 grams per liter of iodate ion, (2) from about 0.25 to about 60.0 grams per liter hexavalent chromium, and (3) from about 0.1 to about 20.0 grams per liter fluorine supplied by a fluorine bearing compound, and having a pH within the range of from about 1.3 to about 2.2.

5. The composition of claim 1 containing additionally an amount of silver within the range of from about 0.06 to about 1.5 grams per liter.

References Cited

UNITED STATES PATENTS

| 2,434,525 | 1/1948 | Thomas et al. | 148—6.2X |
| 2,483,510 | 10/1949 | Stareck | 148—6.2X |
| 2,507,956 | 5/1950 | Bruno et al. | 148—6.2 |
| 2,524,577 | 10/1950 | Stareck | 148—6.2 |
| 2,796,370 | 6/1957 | Ostander et al. | 148—6.2 |
| 2,851,385 | 9/1958 | Spruance et al. | 148—6.2 |
| 2,948,643 | 8/1960 | Pimbley | 148—6.2X |

RALPH S. KENDALL, Primary Examiner

U.S. Cl. X.R.

148—6.27